United States Patent
Van Vickle et al.

(10) Patent No.: US 11,988,886 B1
(45) Date of Patent: May 21, 2024

(54) RIBBON FANOUT FOR MULTICORE FIBER CONNECTIVITY

(71) Applicant: Amazon Technologies, Inc., Seattle, WA (US)

(72) Inventors: Patrick Stephen Van Vickle, Apex, NC (US); Kurt Dehut, Oakland, CA (US); Seth Dwyer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,250

(22) Filed: Mar. 31, 2022

(51) Int. Cl.
*G02B 6/44* (2006.01)
*G02B 6/255* (2006.01)
*G02B 6/38* (2006.01)
*G02B 6/42* (2006.01)

(52) U.S. Cl.
CPC ......... *G02B 6/4472* (2013.01); *G02B 6/2555* (2013.01); *G02B 6/3885* (2013.01); *G02B 6/4249* (2013.01); *G02B 6/4285* (2013.01); *G02B 6/4293* (2013.01)

(58) Field of Classification Search
CPC .. G02B 6/4293; G02B 6/3885; G02B 6/4249; G02B 6/4285
See application file for complete search history.

(56) References Cited

U.S. PATENT DOCUMENTS

| | | | | |
|---|---|---|---|---|
| 4,364,788 A | * | 12/1982 | Bloodworth, Jr. | ... G02B 6/4403 264/261 |
| 4,943,136 A | * | 7/1990 | Popoff | ................. G02B 6/2808 385/46 |
| 2011/0229086 A1 | * | 9/2011 | Bradley | ................. G02B 6/245 385/129 |
| 2014/0205244 A1 | * | 7/2014 | Bradley | ............. G02B 6/02042 385/78 |
| 2015/0063755 A1 | * | 3/2015 | Doany | ..................... G02B 6/30 385/59 |
| 2016/0223774 A1 | * | 8/2016 | Bennett | ................... B29C 48/00 |
| 2022/0357527 A1 | * | 11/2022 | Bansal | ................. G02B 6/4285 |

OTHER PUBLICATIONS

U.S. Appl. No. 17/710,298, "Multicore Fiber Connectivity", filed Mar. 31, 2022.

* cited by examiner

*Primary Examiner* — Eric Wong
(74) *Attorney, Agent, or Firm* — Kilpatrick Townsend & Stockton LLP

(57) ABSTRACT

Multicore fibers can include multiple cores surrounded by a cladding. The cores of the multicore fibers can be coupled with a transition portion to facilitate a fanout into one or more ribbons having multiple single cores.

14 Claims, 9 Drawing Sheets

RIBBON FANOUT FOR MULTICORE FIBER CONNECTIVITY

CROSS-REFERENCE TO RELATED APPLICATIONS

This application is related to U.S. patent application Ser. No. 17/710,298, filed Mar. 31, 2022, entitled "MULTICORE FIBER CONNECTIVITY,", which is hereby incorporated by reference herein in its entirety.

BACKGROUND

Datacenters house collections of servers and networking hardware, including switches and routers. Often optical fibers, for example, single-core fibers and/or optical fiber ribbons, are used to connect the components. The optical fibers can be installed by splicing the cables together. However, splicing certain types of optical fibers together (e.g., multicore fibers) can be an expensive and time-consuming process that uses specialized tools and equipment.

BRIEF DESCRIPTION OF THE DRAWINGS

Various embodiments in accordance with the present disclosure will be described with reference to the drawings, in which.

DETAILED DESCRIPTION

Figure 1A:
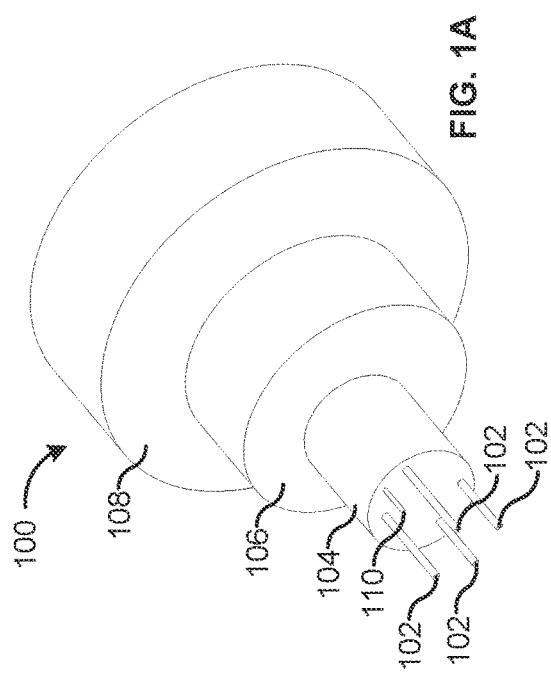
FIGS. 1A and 1B illustrate an example multicore fiber, according to various embodiments.

Among other things, examples herein are directed to systems and techniques relating to optical fibers. The techniques described herein may be implemented by any suitable system that includes optical fibers, but particular examples are described that include multicore fibers. The multicore fibers can include multiple cores surrounded by a cladding. The multicore fibers may be coupled with suitable transition structure to facilitate connection to a standard ribbon (e.g., a ribbon commonly used with fiber optics and fiber optic cables). For example, the multicore fibers and the ribbon may be connected through a suitable transition portion so that signals may be transmitted through cores in the multicore fibers and into cores in the ribbon (or vice versa).

Further examples are described that include multicore fibers with each of the multicore fibers containing multiple cores surrounded by a cladding. The multicore fibers can be formed into a ribbon (e.g., a multicore fiber ribbon). The multicore fiber ribbon can be marked at pre-determined lengths and split into pieces, e.g., which may be easier to transport and/or manage in the field compared to a longer continuous ribbon. The marks can identify like ends of the pieces (e.g., matching ends that can be more easily connected back together). Where a split is imparted, both sides of the split may have an identical rotational orientation of included cores. As a result, when pieces are to be coupled together in the field, like ends may be readily reattached since identical rotational orientations are present in the like ends (e.g., thereby avoiding additional labor to rotate or change rotational orientation at one end to match another end). Rotational orientations may vary from one multicore fiber to another situated alongside within the ribbon, yet each multicore fiber may have an orientation that matches with the corresponding multicore fiber in a matching end produced by an earlier split.

Additionally or alternatively, at an end of the multicore fiber ribbon, a transition portion may be provided so that signals may be transmitted from cores of the multicore fibers into one or more conventionally sized ribbons (or vice versa). For example, the transition portion may facilitate communication between a multicore fiber ribbon and conventionally sized ribbons that can be easily spliced and/or joined with optical fiber ribbons having standard characteristics.

Turning now to a particular example, three multicore fibers can be received. Each of the multicore fibers can include four cores surrounded by a cladding (e.g., such that twelve total cores are present within the group of three multicore fibers). For each of the three multicore fibers, the four cores can be coupled with a transition portion, which may in turn be coupled with a ribbon having twelve single-core fibers. The transition portion can allow the twelve cores from the multicore fibers to respectively align with and/or provide transmission of signals respectively relative the twelve cores of the ribbon. The ribbon can correspond to and/or be coupled and/or spliced to a conventional and/or a traditional ribbon.

Turning now to another example, twelve multicore fibers can be formed into a multicore fiber ribbon. Each of the twelve multicore fibers can include four cores surrounded by a cladding (e.g., the multicore fiber ribbon can include a total of forty-eight cores). Due to manufacturing variations, the multicore fibers may exhibit different degrees of spiral or rotation along a length of the multicore fibers. Thus, at a given length, similar multicore fibers may nevertheless exhibit different rotational orientations of the four included cores. Within the ribbon, the multicore fibers may be fixed relative to one another (e.g., which may cause cores to be fixed at different rotational orientations within different multicore fibers within the ribbon). To facilitate joining while different rotational orientations may be present or maintained, the multicore fiber ribbon can be marked at predetermined lengths and split into pieces. The marks can identify the ends of pieces that can be readily (e.g., easily) joined together. For example, the marks may identify two ribbon piece ends that have an identical combination of rotational orientations for the multicore fibers and which may thus be readily connected with one another without need for imparting individual rotation of multicore fibers in one ribbon piece end to align included cores with cores in multicore fibers in the other ribbon piece end of the splice.

Additionally or alternatively, at an end of the multicore fiber ribbon, a transition portion may be provided so that signals from the cores in the multicore fiber ribbon (e.g., the forty-eight cores) can be conveyed into and/or from a set of cores in a group of multiple standard and/or conventional sized ribbons that may also be connected with the transition portion. For example, the transition portion may fan out into four standard ribbons with each standard ribbon having twelve cores (e.g., such that the forty-eight total cores from the twelve multicore fibers are in a one-to-one connection with the forty-eight total cores of the four standard ribbons). Other standard ribbon configurations may be used, such as, but not limited to, standard ribbons with four, eight, or sixteen cores apiece. For example, such arrangements may result in respective fanouts of twelve, six, or three standard ribbons from the example of the forty-eight core multicore fiber ribbon, although other numbers, types, and/or arrangements of multicore fibers and/or standard ribbons may be utilized to obtain differing ratios on opposite sides of the fanout. The standard ribbons can be joined (e.g., spliced) with traditional and/or conventional ribbons. For example, relevant fanouts may provide interoperability among different forms of fiber optic conduits (e.g., between multicore fiber ribbon and standard ribbon having multiple single core fibers).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1B:
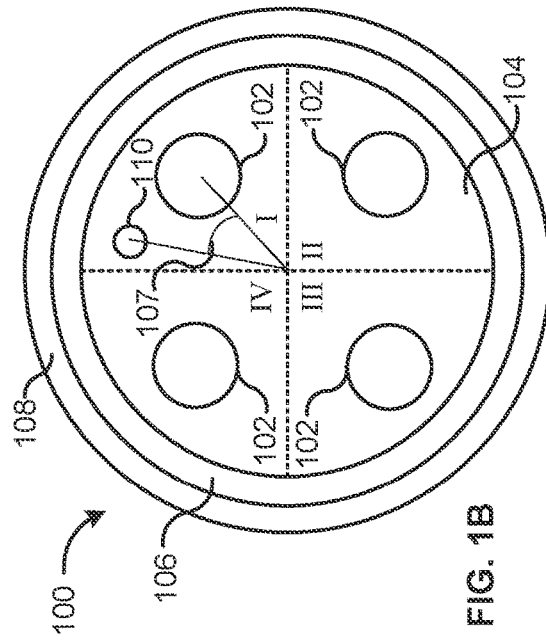

Turning now to the figures, FIGS. 1A and 1B illustrate an example multicore fiber 100. FIG. 1A shows a perspective view of the multicore fiber 100 with portions of layers of material removed for ease of viewing. FIG. 1B is a front view of the multicore fiber 100 showing the positioning of the various components. FIGS. 1A and 1B show a multicore fiber 100 having four cores 102, however, the multicore fiber 100 can include any suitable number of cores 102.

The multicore fiber 100 can be or include an optical fiber containing one or more cores 102. The cores 102 can be positioned within a cladding 104. The cladding 104 can be or include glass, plastic, or other rigid or semi-rigid material that can allow the multicore fiber 100 to flex while maintaining the relative positions of the cores 102. For example, the cladding 104 can keep the cores 102 separated from one another such that signals being transmitted through the respective separate cores 102 do not interfere with one another.

The multicore fiber 100 can include one or more coatings 106, 108. The coatings 106, 108 can reduce or prevent environment factors from interfering with the signals traveling through the multicore fiber 100. For example, the coatings 106, 108 can reduce or prevent environmental light from interfering with the signals traveling through the cores 102 of the multicore fiber 100. In various embodiments, the multicore fiber 100 can include a primary coating 106 and a secondary coating 108. The primary coating 106 can be or include a UV coating positioned around the cladding 104. The primary coating 106 can be or include a soft plastic material. The secondary coating 108 can be or include a UV coating positioned around the primary coating 106. The secondary coating 108 can be or include a hard plastic coating.

In various embodiments, the multicore fiber 100 can include an alignment marker 110. The alignment marker 110 can be surrounded by the cladding 104. The alignment marker 110 can correspond to a strip of material extending through the cladding 104. The alignment marker 110 can be used to align the ends of the multicore fiber 100. For example, two multicore fibers 100 can be aligned using the alignment marker 110 such that alignment of the alignment marker 110 also align the cores 102. In further embodiments, the alignment marker 110 can transmit a signal which can be used to align the ends of the multicore fibers 100. For example, detection of the signal traveling through the alignment marker 110 can indicate alignment of the multicore fibers 100. The alignment marker 110 can be or include glass, plastic, a polymer, and/or any suitable material.

The multicore fiber 100 can transmit one or more signals through the cores 102 (e.g., one or more signals per core 102). For example, the multicore fiber 100 can transmit light signals from one end of the multicore fiber 100 to another end of the multicore fiber 100. In various embodiments, each of the cores can act as a separate waveguide that can independently propagate a signal (e.g., light) therethrough. Multicore fibers 100 can be employed in any suitable situation where high-speed data transmission is desired. For example, multicore fibers 100 can be used in datacenters, for example, to connect various components (e.g., server components).

The cores 102 can be or include fiber strands that can transmit waveforms through the multicore fiber 100. In various embodiments, the cores 102 can be a single-mode core 102 and/or a multi-mode core 102. The single-mode core 102 can support a single propagation mode per polarization direction for a given wavelength. The multi-mode core 102 can support multiple transverse guided modes for a given optical frequency and/or polarization. The number of guided modes can be determined by the wavelength and/or optical frequency and the refractive index profile of the cores 102. The cores 102 can be or include polymers (e.g., polymethyl methacrylate or acrylic), glass, plastic, and/or any suitable material.

The cladding 104 can be or include a rigid or semi-rigid material such that the cores 102 can be positioned within the cladding 104 and held in place (e.g., relative to one another). The cladding 104 can be or include a material with a refractive index that is different than the refractive index of the cores 102. For example, the refractive index can be increased or decreased by doping material with index-raising or index-lowering material. In various embodiments, the cladding 104 can be or include glass, polymers, silica fibers, plastic, and/or any suitable rigid or semi-rigid material.

As shown in FIG. 1B, the cores 102 and/or the alignment marker 110 can be arranged in the cladding 104. For example, the cores 102 can be arranged such that one core 102 is positioned in each of the respective quadrants I, II, III, and IV. Positioning one core 102 per quadrant can reduce interference between the signals traveling through the cores 102 (e.g., reduce or prevent a signal traveling through one core from interfering with a signal traveling through another core 102). Additionally or alternatively, the alignment marker 110 can be positioned in one of the quadrants I, II, III, or IV. For example, the alignment marker 110 may be arranged at a particular angle 107 relative to the center of the core 102 in the first quadrant I. However, the alignment marker 110 can be positioned relative to any frame of reference in any suitable non-symmetric position within the cladding 104 that can allow for unique distance and/or orientation relative to the cores 102 to permit relative identification in use.

Figure 1C:
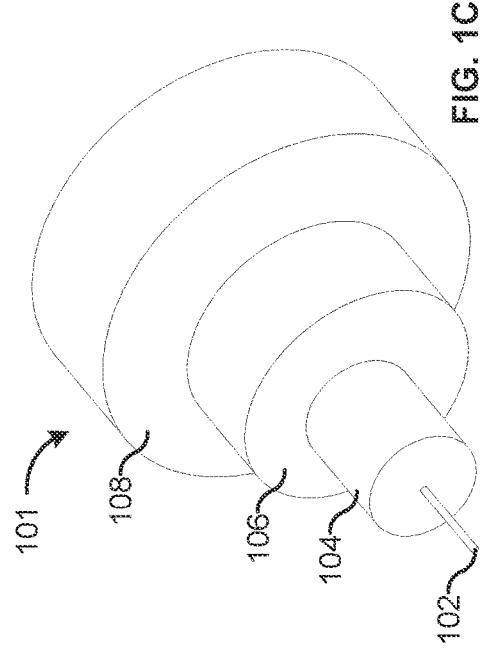
FIGS. 1C and 1D illustrate an example single-core fiber, according to various embodiments.
Figure 1D:
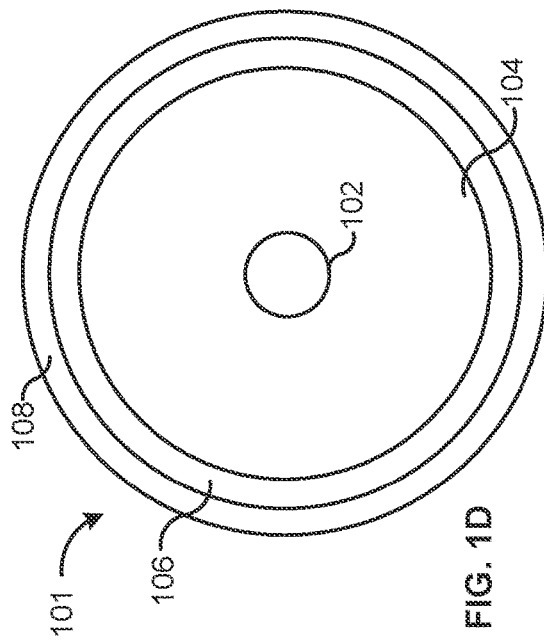

For comparison, FIGS. 1C and 1D illustrate an example single-core fiber 101. FIG. 1C shows a perspective view of the single-core fiber 101 with portions of layers of material removed for ease of viewing. FIG. 1D is a front view of the single-core fiber 101 showing the positioning of the various components. The single-core fiber 101 of FIGS. 1C and 1D may include similar features as in FIGS. 1A and 1B. For example, the core 102, cladding 104, and coatings 106, 108 of the single-core fiber 101 may be similar to like-named features of the multicore fiber 100. The single-core fiber 101 may include a single core 102 in contrast to the multiple cores 102 of the multicore fiber 100. In various embodiments, the single-core fiber 101 may be utilized (e.g., in association with other components described herein) to facilitate interoperability and/or connection between the multicore fiber 100 and other elements.

Figure 2:
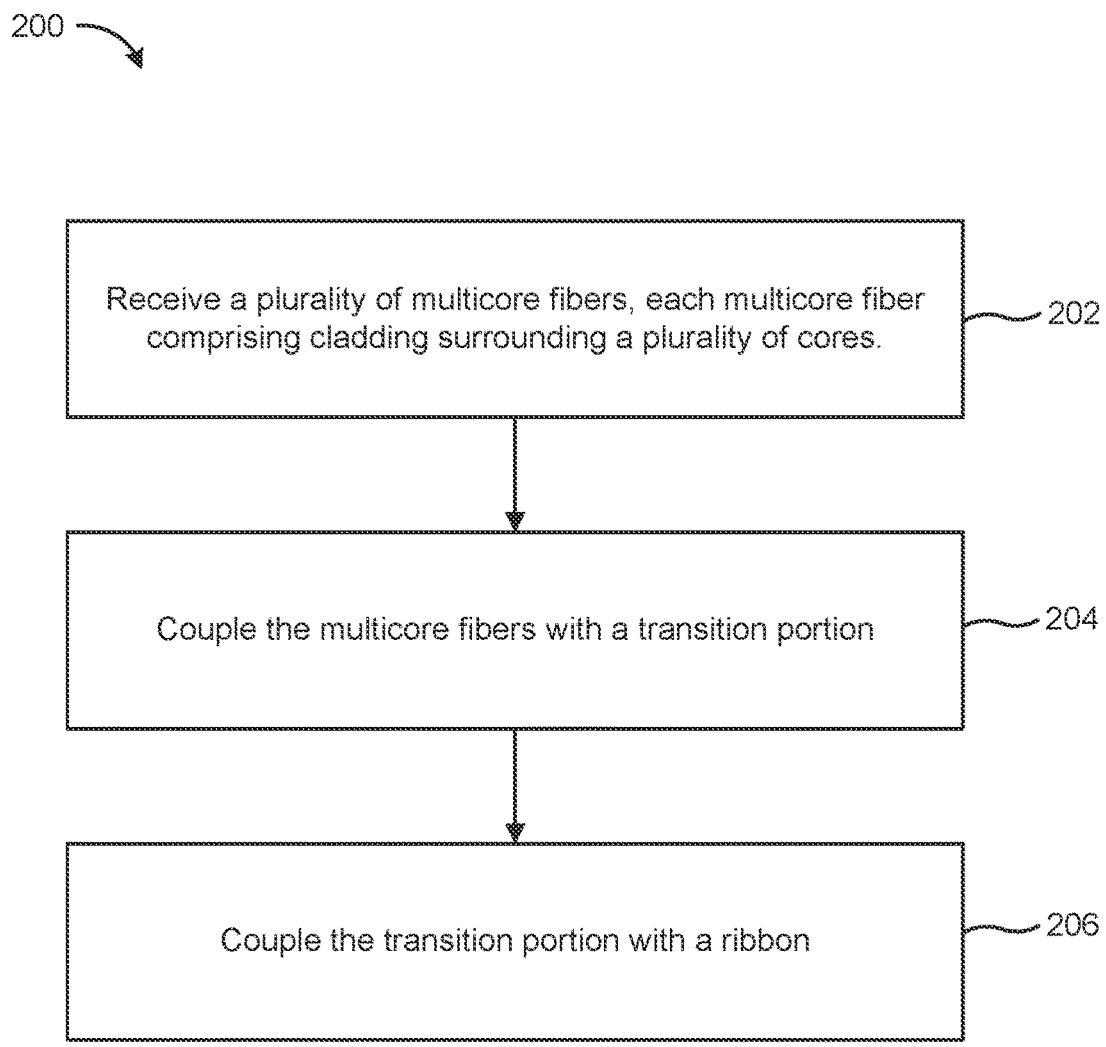
FIG. 2 is a flowchart illustrating a process for forming a ribbon fanout using the multicore fiber of FIG. 1, according to various embodiments.

Turning to FIG. 2, an example process 200 for forming a ribbon fanout using the multicore fiber 100 of FIGS. 1A and 1B is shown. Various blocks of the process 200 are described by referencing the components shown in FIG. 3, however, additional or alternative components may be used with the process 200.

Figure 3:
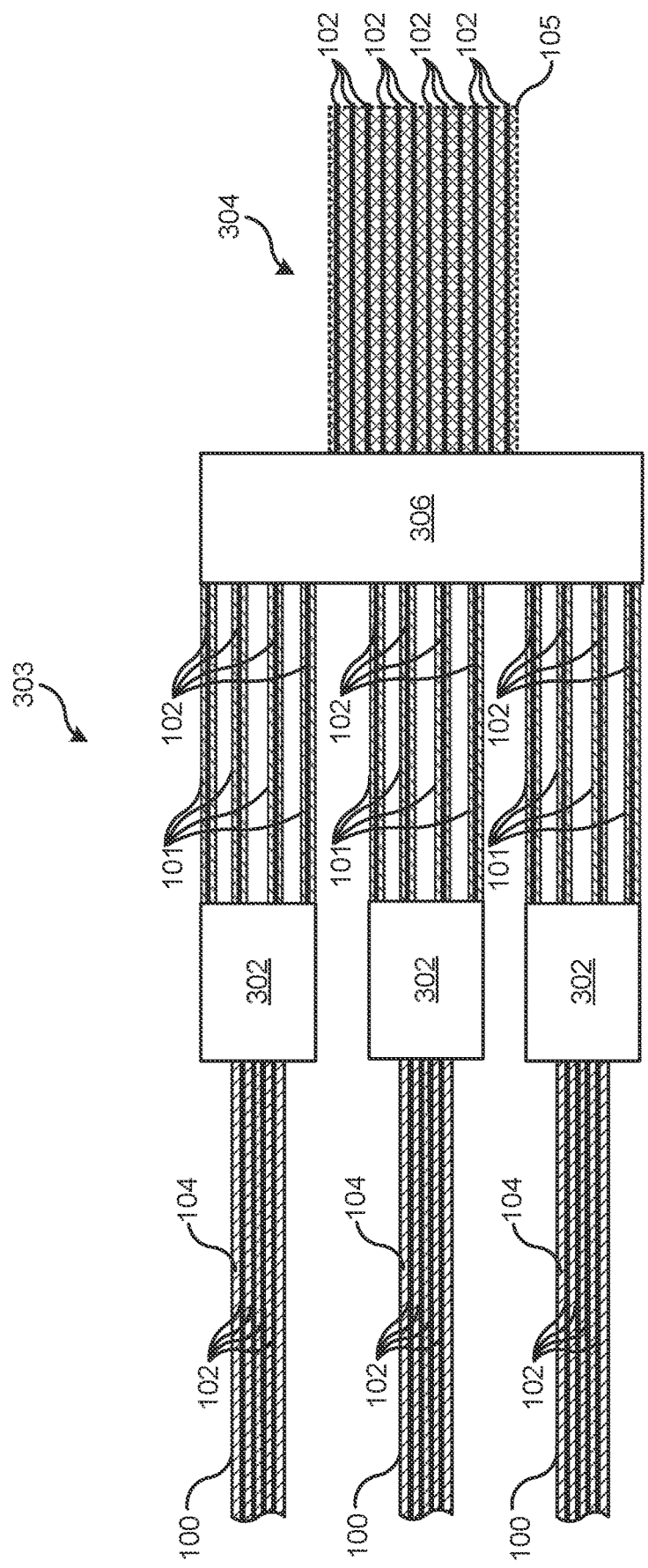
FIG. 3 is a block diagram showing the transition between the multicore fiber of FIGS. 1A and 1B and a standard ribbon, according to various embodiments.

The process 200 at block 202 can include receiving a plurality of fibers (e.g., multicore fibers 100). In various embodiments, for example as shown in FIG. 3, three multicore fibers 100 can be received. Each of the multicore fibers 100 in FIG. 3 may have a construction consistent with that shown in FIG. 1. Each of the multicore fibers 100 can include cladding (e.g., cladding 104) surrounding a plurality of cores (e.g., cores 102). The cores 102 can be arranged in the cladding 104 in a pattern, for example, to separate the cores 102 from one another and reduce or prevent interference between the cores 102. As shown in FIG. 1B, the cores 102 can be arranged with a core positioned in each of the quadrants of cladding 104, however, the cores 102 can be arranged in any suitable pattern.

The process 200 at block 204 can include coupling the multicore fibers (e.g., multicore fibers 100) with a transition portion (e.g., 303 of FIG. 3). As shown in FIG. 3, the transition portion 303 may include suitable structure for connecting with a ribbon 304. In FIG. 3, the transition portion 303 is shown with adaptors 302, single-core fibers 101, and a transition part 306.

The adaptor 302 can include suitable structure for facilitating connection between cores 102 in the multicore fibers 100 and cores 102 in the individual single-core fibers 101. Examples may include planar wave guides, vanishing core structures, conduits formed by a draw-down technique during a glass-making process, focusing lenses, and/or other elements or methods. The adaptor 302 may align or otherwise facilitate transmission of signals between cores 102 in the multicore fibers 100 and cores 102 in the single-core fibers 101.

The transition part 306 can include suitable structure for facilitating connection between cores 102 of the individual single-core fibers 101 and cores in the ribbon 304. Examples may include ribbonizing guides, fusion splicing kits, and/or other elements or methods. The transition part 306 may align or otherwise facilitate transmission of signals between cores 102 in the single-core fibers 101 and cores 102 in the ribbon 304. In an assembled state, individual single-core fibers 101 may have a first end coupled with the adaptor 302 and a second end coupled with the transition part 306, for example.

Although FIG. 3 shows the transition portion 303 with a particular arrangement of adaptors 302, single-core fibers 101, and a transition part 306, other arrangements are possible. For example, the transition portion may utilize a different number and/or type of components. In some examples, the transition portion 303 may be condensed into a single housing that performs the functions instead of discrete components. The transition portion 303 may be coupleable with the multicore fibers 100 and the ribbon 304 such that cores 102 of the ribbon 304 are aligned with cores 102 multicore fibers 100 to enable transmission of signals through paths formed through multicore fibers 100, the transition portion 303, and the ribbon 304.

The process 200 at block 206 can include coupling the transition portion (e.g., transition portion 303) with a ribbon (e.g., ribbon 304). For example, as shown in FIG. 3, the ribbon 304 can include twelve cores 102 (e.g., which may be in respective communication for transmission of signals with the twelve total cores 102 from three multicore fibers 100 with each multicore fiber 100 having four cores 102). However, the ribbon 304 can include any suitable number of cores 102. For example, the ribbon 304 can include any suitable number of cores 102 that can allow the ribbon 304 to connect to a conventional sized ribbon (e.g., a conventionally sized ribbon used in datacenters and the like). Some other prevalent examples may include four, eight, or sixteen cores 102 within the ribbon 304, for example. As a further illustrative example, the ribbon 304 may include four cores 102 (e.g., in which case others of the multicore fibers 100 may be omitted until reaching a suitable correspondence of resulting cores 102 on either side of the transition portion 303). The ribbon 304 can be a planar ribbon (e.g., a flat ribbon). The ribbon 304 can additionally or alternatively be any suitable shape (e.g., round and/or hexagonal).

In various embodiments, the ribbon 304 can be formed by joining its cores 102 (and/or associated layers such as cladding 104 and/or coatings 106, 108) to one another. The cores 102 of the ribbon 304 can be joined to one another. For example, the cores 102 may be joined into a body 105. The cores 102 may be joined using, for example, an adhesive. For example, the adhesive once cured may make up at least some material of the body 105. In further embodiments, the cores 102 can be joined using a substrate (e.g., which may form the body 105). For example, the cores 102 can be coupled with the substrate or other form of body 105 to form the ribbon 304.

Figure 4:
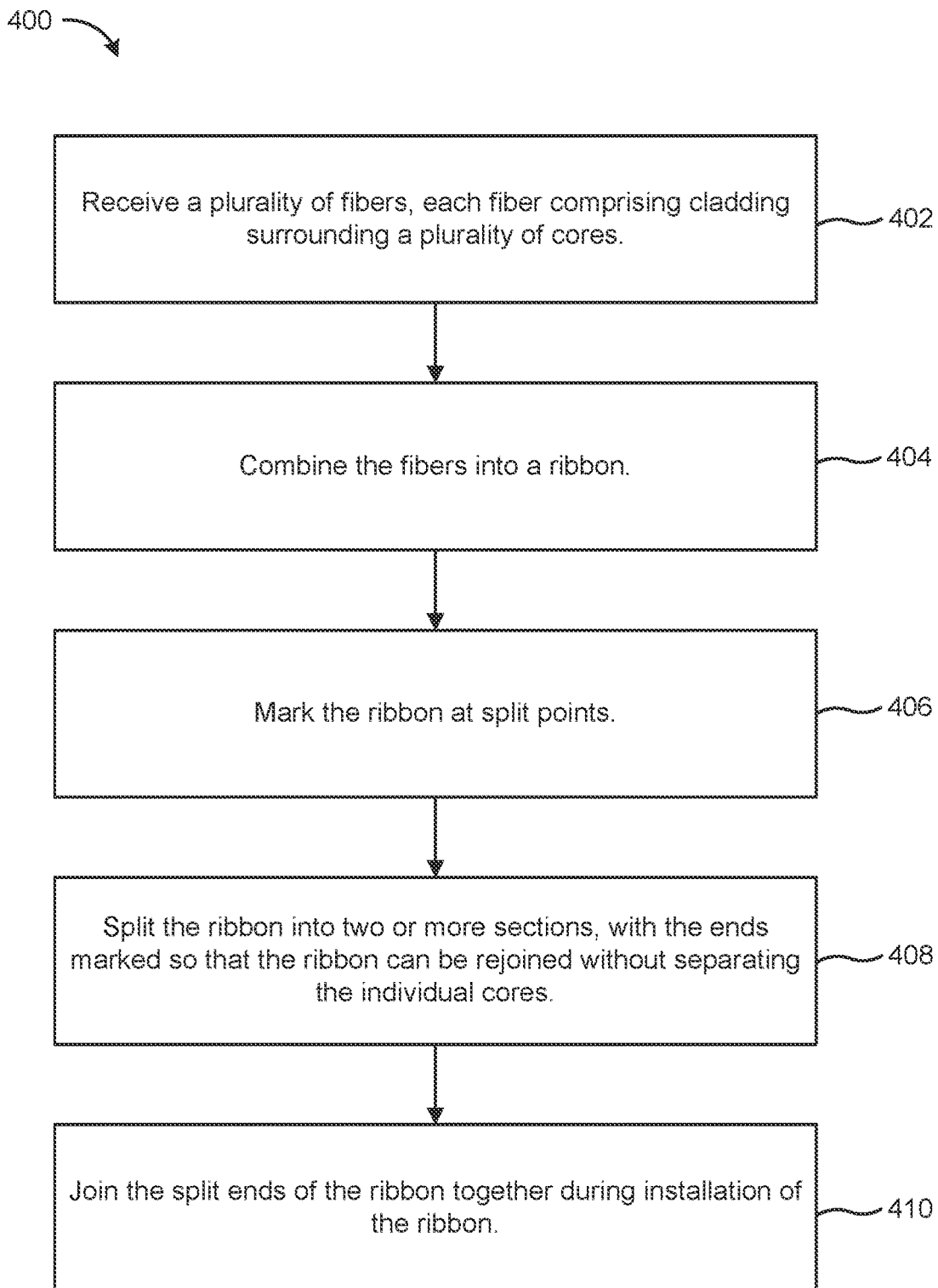
FIG. 4 is a flowchart illustrating a process for forming a multicore fiber ribbon using the multicore fiber of FIGS. 1A and 1B, according to various embodiments.

Turning to FIG. 4, an example process 400 for forming a multicore fiber ribbon 500 using the multicore fiber 100 of FIGS. 1A and 1B is shown. Various blocks of the process 400 are described by referencing the components shown in FIGS. 5A through 7C, however, additional or alternative components may be used with the process 400.

The process 400 at block 402 can include receiving a plurality of fibers (e.g., multicore fibers 100). As shown in FIG. 5B, each of the multicore fibers 100 can include a cladding (e.g., cladding 104) surrounding a plurality of cores (e.g., cores 102, which are obscured from view in FIG. 5A, but which may be arranged as shown in FIGS. 1A, 1B, and/or 5B, for example). The cores 102 can be arranged in the cladding 104 in a pattern, for example, to separate the cores 102 from one another and/or to reduce or prevent interference between the cores 102. As shown in FIG. 1B, the cores 102 can be arranged with a core positioned in each of the quadrants of cladding 104, however, the cores 102 can be arranged in any suitable pattern.

Figure 5A:
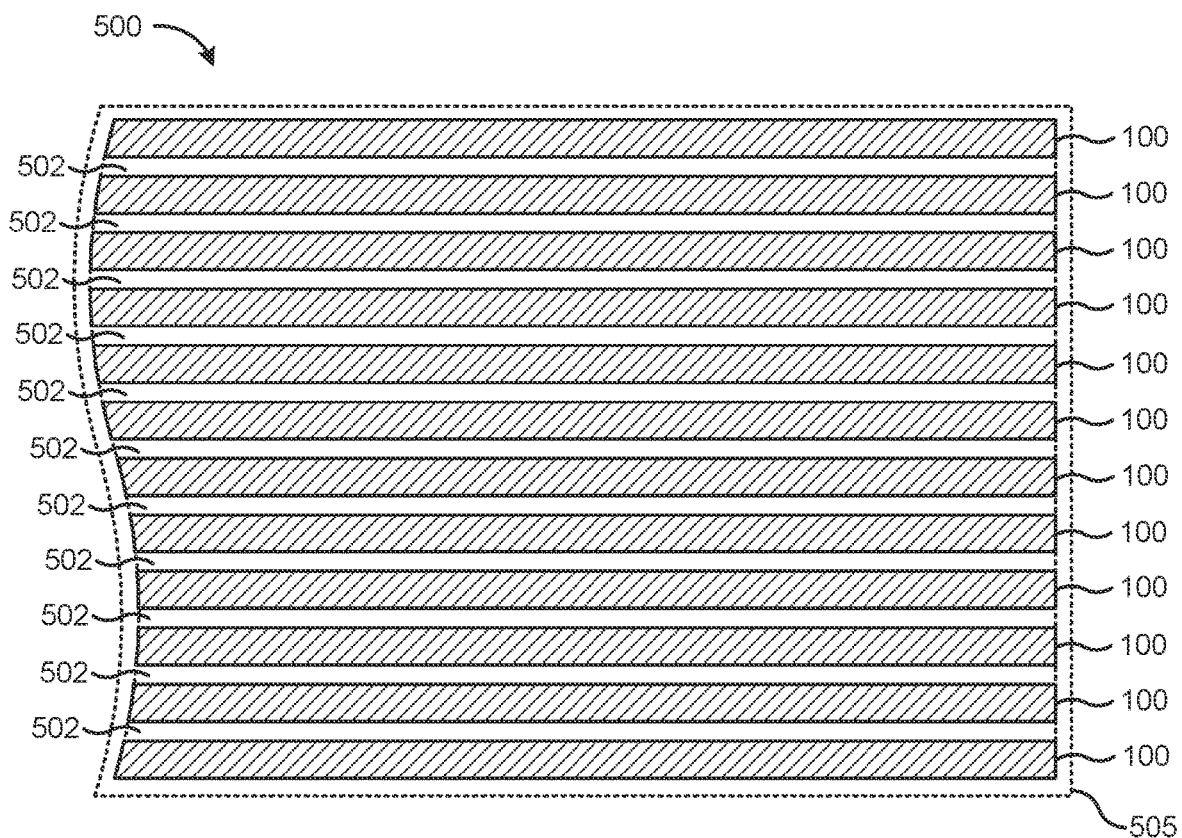
FIGS. 5A through 7C illustrate various states of components that may be implemented in a simplified process for sectioning the multicore fiber ribbon used in the process of FIG. 4, according to various embodiments.
Figure 5B:
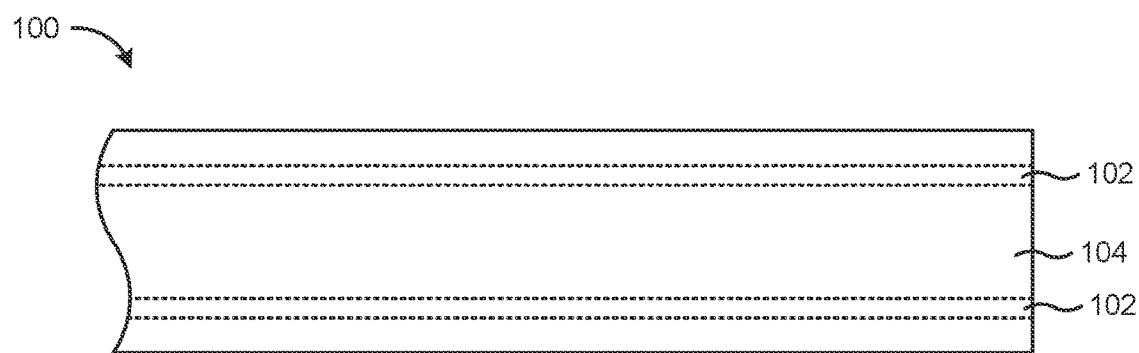

The process 400 at block 404 can include combining the multicore fibers 100 into a ribbon (e.g., ribbon 500 shown in FIG. 5A). In FIG. 5A, the ribbon 500 is depicted with twelve multicore fibers 100. However, four, eight, twelve, sixteen, or any other suitable number of multicore fibers 100 may be utilized. The ribbon 500 can be generally planar (e.g., flat), however, the ribbon 500 may be any suitable shape.

The multicore fibers 100 can be joined to one another. For example, the multicore fibers 100 may be joined into a body 505. The multicore fibers 100 can be joined together using, for example, an adhesive. For example, the adhesive once cured may make up at least some material of the body 505. The multicore fibers 100 can be directly connected to one another (e.g., with the coating 106 or 108 of one multicore fiber 100 being joined directly to the coating 106, 108 of another multicore fiber 100) and/or can be connected to one another via a substrate 502 (e.g., which may form the body 505). For example, the substrate 502 can be or include adhesive and/or a rigid or semi-rigid material which can be used to connect the multicore fibers 100 to one another and/or form the body 505.

Figure 6A:
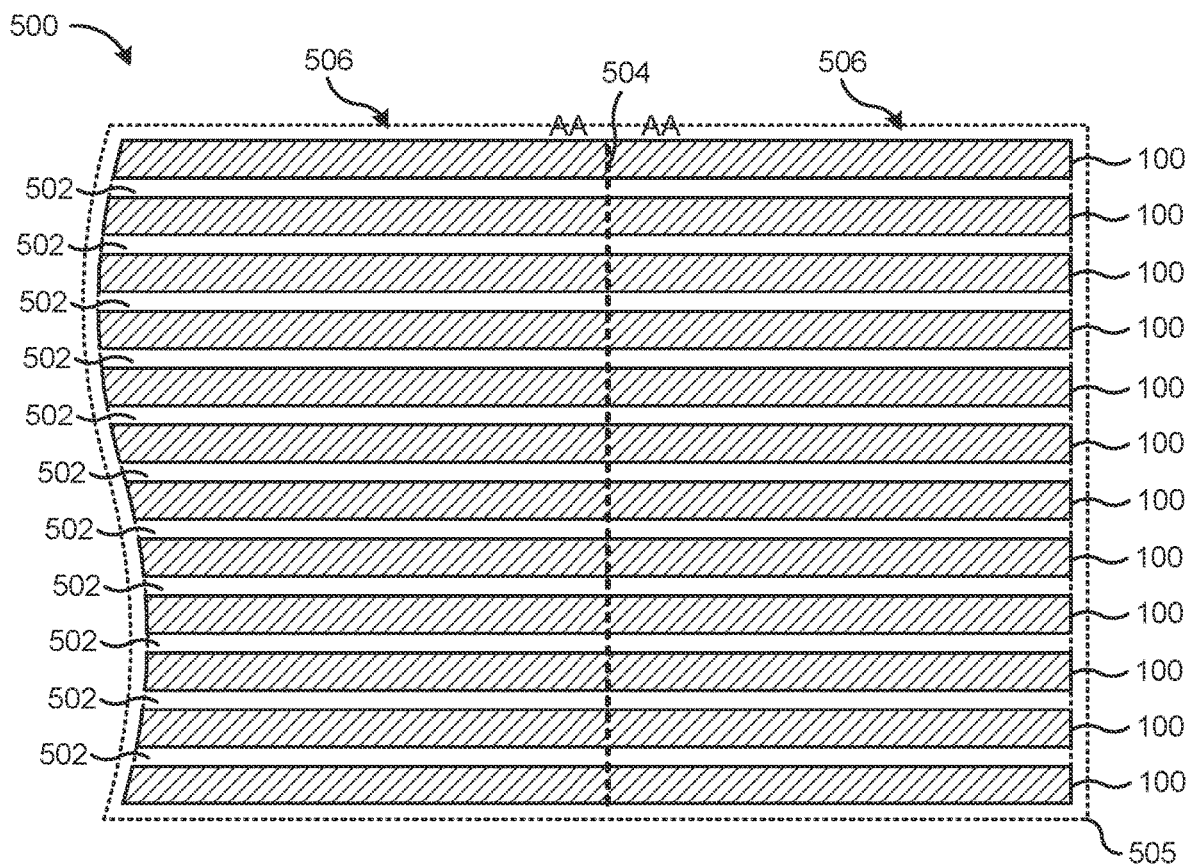

The process 400 at block 406 can include marking the ribbon 500 at split points (e.g., a point where the ribbon 500 is split into sections 506). For example, as shown in FIG. 6A, the ribbon 500 can be marked along a line 504. The line 504 can portion the ribbon 500 into sections 506 with each section 506 having a predetermined length. For example, the ribbon 500 can be portioned into sections 506 (e.g., multiple cables) with each section having a length of around 3 km. However, the sections 506 can have any suitable length, which may be the same or different from one another.

Figure 6B:
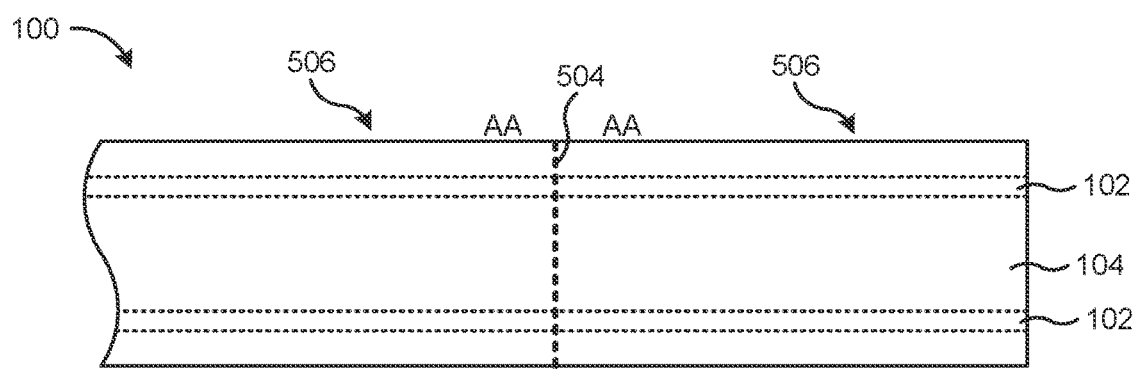

In various embodiments, marking the ribbon 500 at split points can include marking the ends of the sections 506. For example, as shown in FIGS. 6A and 6B, the ends of the sections 506 can be marked (e.g., AA) to identify the like ends (e.g., the ends that can be rejoined together). The like ends AA can have the same polarity and core position to allow for joining of the like ends AA using traditional joining (e.g., splicing) techniques and equipment. For example, the marked ends AA can be joined together after separation without having to individually align the cores 102 of the multicore fibers 100.

Figure 7A:
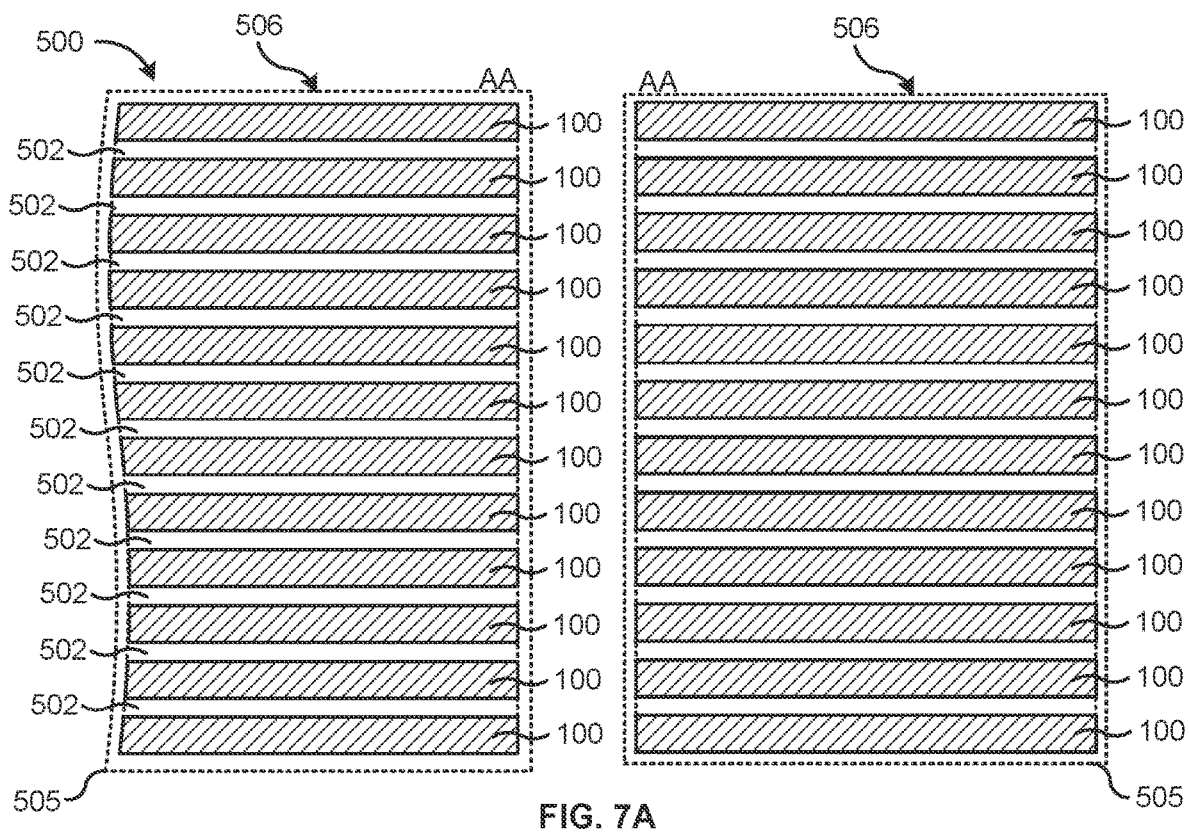
Figure 7B:
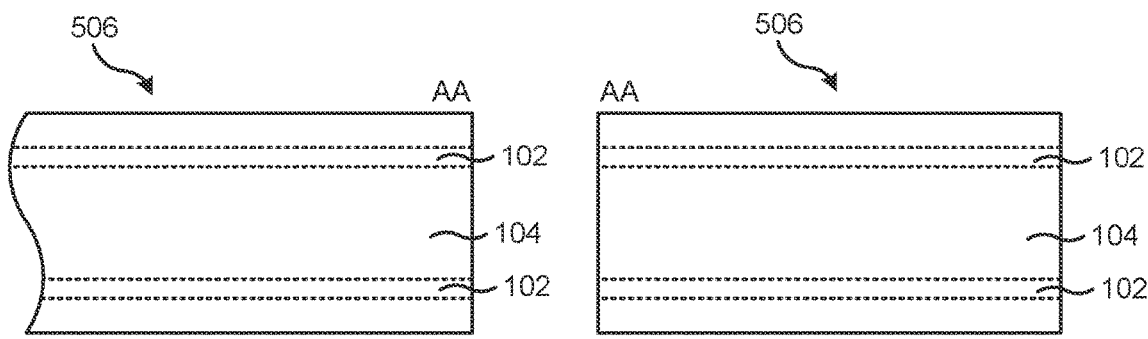
Figure 7C:
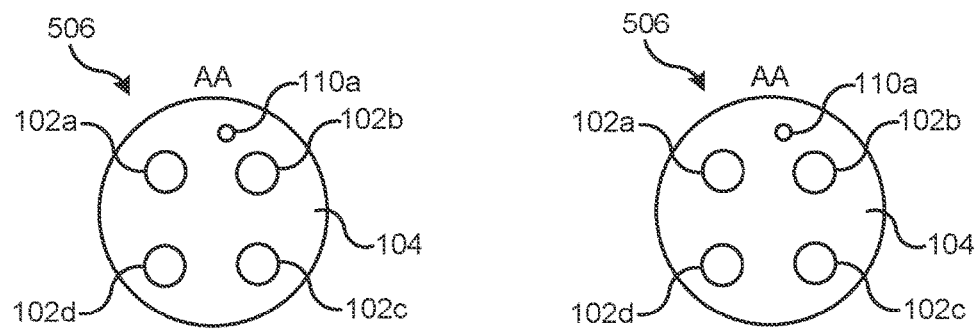

The process 400 at block 408 can include splitting the ribbon 500 into two or more sections 506. The ribbon 500 can be split along the split points (e.g., line 504). The ribbon 500 can be split using traditional methods and techniques. For example, the ribbon 500 can be split using methods and techniques that are used to split conventional ribbons and/or single core fibers. As shown in FIGS. 7A through 7C, the sections 506 of the ribbon 500 can be separated after being split.

The process 400 at block 410 can include joining the split ends AA of the ribbon 500 together. The split ends AA can be joined together during installation of the ribbon 500. For example, installation may include installation of the ribbon 500 in a datacenter or between datacenters. The split ends AA of the ribbon 500 can be joined together using traditional joining (e.g., splicing) techniques. For example, the split ends AA of the ribbon 500 can be joined using a mass splicer. Splicing multiple of the multicore fibers 100 within the ribbon in a single collective or mass operation may provide savings in time, labor, or complexity in operation compared to individual splicing operations per multicore fiber 100. However, any suitable splicing techniques and/or devices can be used.

As shown in FIG. 7C, the split ends AA of the ribbon 500 can be joined together to join the cores 102 and/or the alignment marker 110. For example, the cores 102 can be joined together and/or optically coupled to transmit a signal through multiple sections 506. The cores 102 can be joined together and/or optically coupled using traditional/conventional ribbon splicing techniques. For example, the like ends AA of the ribbon 500 can be aligned, which can also align the cores 102. Aligning the cores 102 using traditional/conventional techniques can allow the cores 102 to be aligned and/or optically coupled without separating the cores 102 from the cladding 104. For example, the cores 102 of the ribbon 500 can be aligned without removing the cladding 104 and aligning the individual cores 102. Aligning the cores 102 of the ribbon 500 may bring sections 506 of the ribbon 500 into contact and/or into suitable position for optical coupling with one another (e.g., back to a position such as shown in FIGS. 6A and/or 6B). During coupling of sections 506 of the ribbon 500, orientations (e.g., rotational orientations) of cores 102 within the multicore fibers 100 within the ribbon 500 may be maintained. Maintaining orientations may allow for alignment and/or optically coupling of the cores 102 without additional operations of rotating the cores 102 (or cladding 104 or other associated layers) to a suitable alignment for joining.

The joining at 410 may include operations performed by an installer, such as a technician and/or a machine. For example, the installer may receive a plurality of ribbon pieces 506 (such as in FIG. 7B). The ribbon pieces 506 may have a marked end marked with an identifier (e.g., AA in FIG. 7B). The identifier may indicate a matching end from a counterpart ribbon piece 506 from among the ribbon pieces 506. For example, for the ribbon piece 506 at left in FIG. 7B, the counterpart may be the ribbon piece 506 at right in FIG. 7B. Based on the identifier, the installer may arrange a particular ribbon piece 506 so that the marked end is adjacent the matching end of the counterpart ribbon piece 506. Arranging the ribbon pieces 506 together may include arranging the bodies 505 of the ribbon pieces 506 together, e.g., which may in turn align cores 102 within the ribbon pieces 506 in suitable alignment for splicing or other joining. In use, joining the cores 102 of the ribbon pieces 506 where the ribbon 500 was cut may cause the cores 102 to align and account for any rotation of the cores 102 that may vary along the length of the ribbon 500 due to variations in manufacturing. Thus, the cores 102 may be aligned or optically coupled by merely joining the ribbon pieces 506 along the prior cut line and may allow the cores 102 to be joined without incurring additional labor or expense to rotate the arrangement of cores 102 to match an orientation of another multicore fiber 100 to be joined. In various examples, the splicing and/or joining at 410 may be simplified and/or facilitated by each multicore fiber 100 within the ribbon 500 having its four cores 102 (or other number of cores 102) arranged in a rotational orientation that is identical on both spliced ends present at a juncture formed by the splicing. For example, the multicore fiber 100 may have the cores 102 arranged in an identical rotational orientation in both spliced ends at the juncture on account of the ends corresponding to a position the multicore fiber 100 was cut previously (e.g., at 408).

Figure 8:
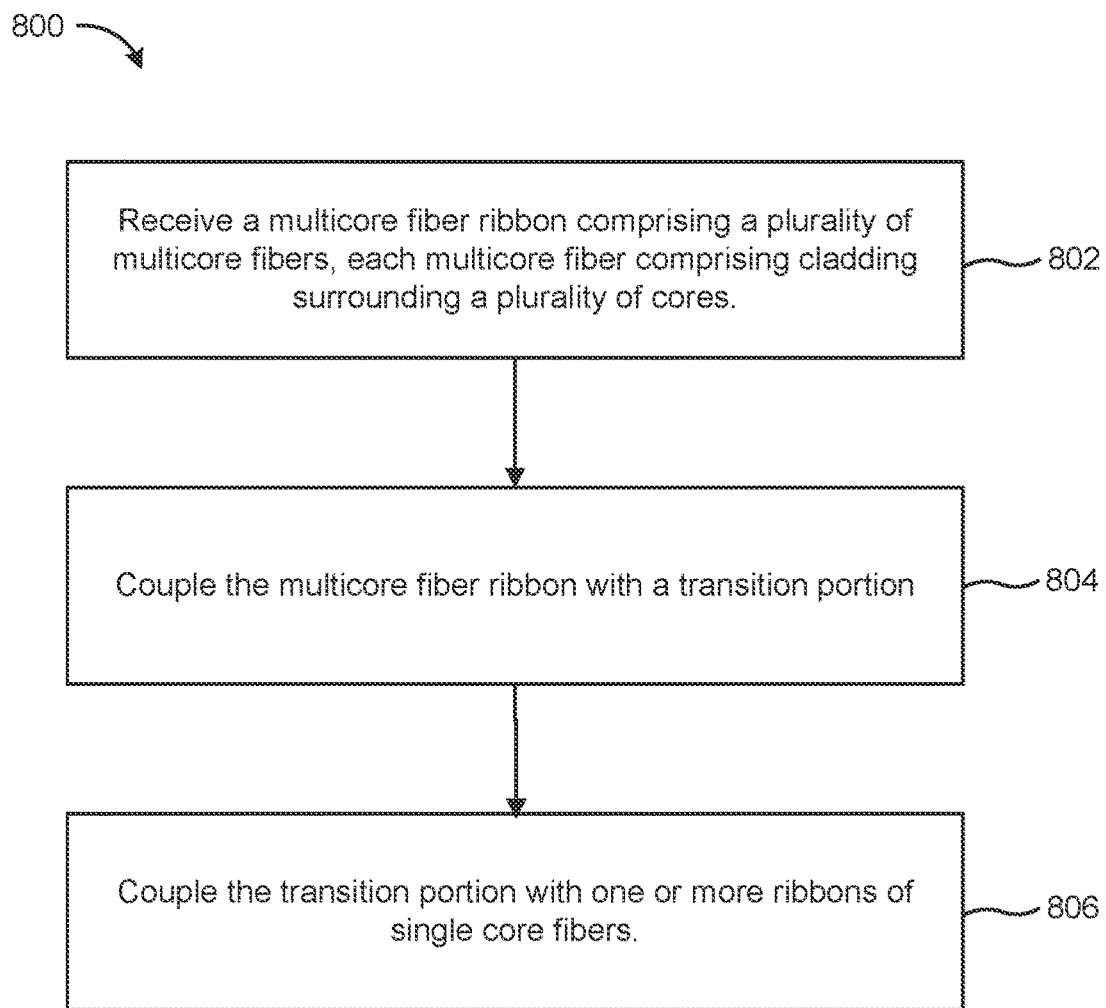
FIG. 8 is a flowchart illustrating a process for transitioning to a standard ribbon from the multicore fiber ribbon of FIG. 5A, according to various embodiments.
Figure 9:
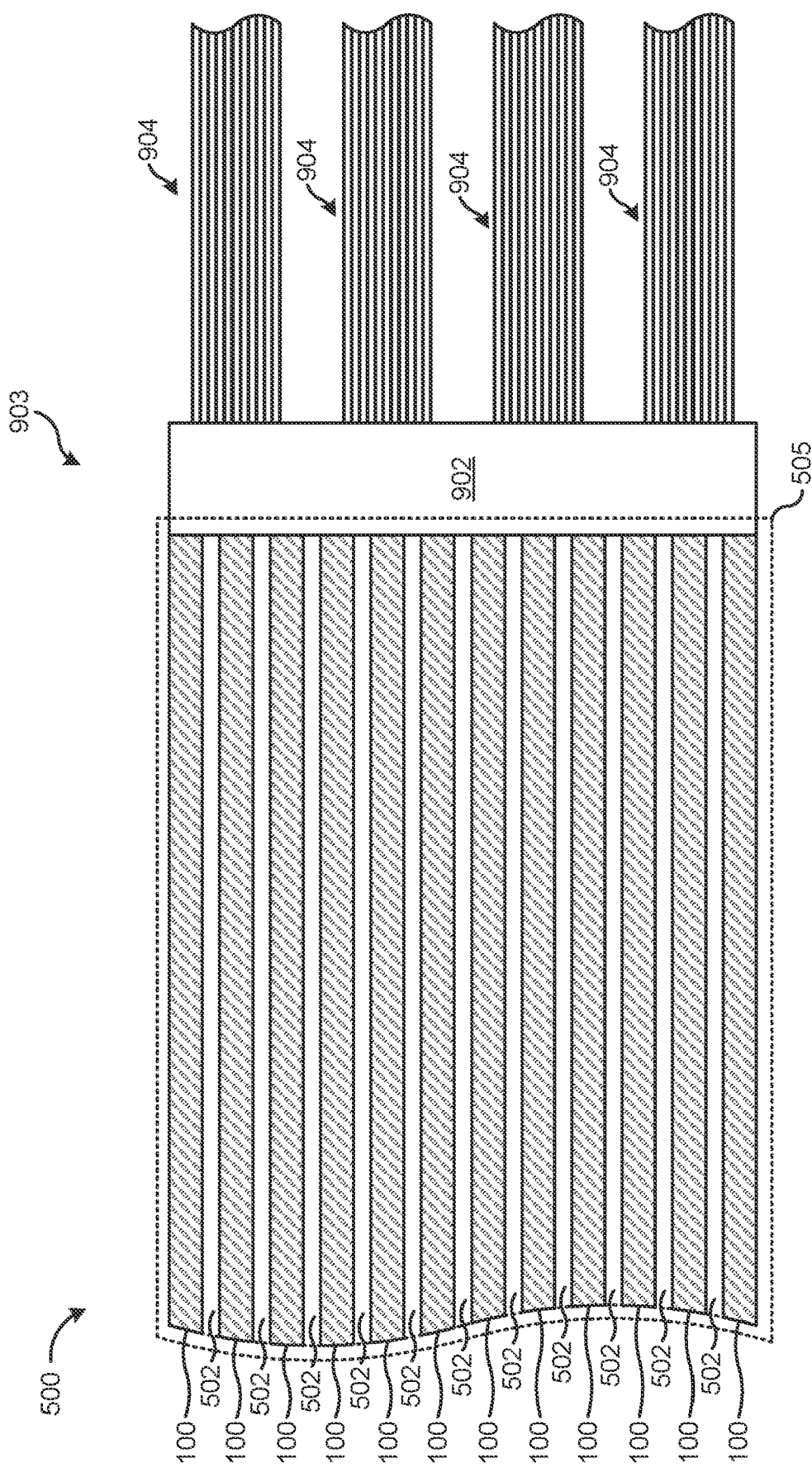
FIG. 9 is a block diagram showing the transition between the multicore fiber ribbon of FIG. 5A and standard ribbons, according to various embodiments.

Turning to FIG. 8 a process 800 for producing a fanout to one or more standard ribbons 904 from a multicore fiber ribbon (e.g., ribbon 500) is shown. Various blocks of the process 800 are described by referencing the components shown in FIG. 9, however, additional or alternative components may be used with the process 800.

The process 800 at block 802 can include receiving a fiber optic ribbon (e.g., ribbon 500). The ribbon 500 can include multiple multicore fibers (e.g., multicore fibers 100). Each of the multicore fibers 100 can include multiple cores (e.g., cores 102) surrounded by a cladding (e.g., cladding 104). In various embodiments, the ribbon 500 can include twelve multicore fibers 100, however, the ribbon 500 may include any suitable number of multicore fibers 100. Additionally or alternatively, the multicore fibers 100 can each include four cores 102. In some embodiments, the ribbon 500 can include forty-eight cores 102.

The process 800 at block 804 can include coupling the ribbon 500 with a transition portion (e.g., a transition portion 903). The transition portion 903 may include similar structure to that described for transition portion 303, for example. In some examples, the transition portion 903 may differ in being able to accommodate differing types and/or numbers of structures. For example, in FIG. 9, the transition portion 903 may be capable of receiving the ribbon 500. In some embodiments, the transition portion 903 may include a portion of a ribbon piece 506 that was previously severed (e.g., which may facilitate splicing or joining multiple of the multicore fibers 100 within the ribbon 500 in a single collective or mass operation in lieu of individual splicing operations per multicore fiber 100 that may incur additional time or complications). In some embodiments, during coupling of the ribbon 500 with the transition portion 903, orientations (e.g., rotational orientations) of cores 102 within the multicore fibers 100 within the ribbon 500 may be maintained. Maintaining orientations may allow for alignment of the cores 102 without additional operations of rotating the cores 102 to a suitable alignment for joining.

In some embodiments, the transition portion 903 includes a housing 902. The housing 902 may be suitable for receiving and/or connecting with the ribbon 500 and/or with other structures.

The process 800 at block 806 can include coupling the transition portion 903 with one or more ribbons 904. The ribbons 904 may be single-core fiber ribbons 904, e.g., each including single-core fibers 101 having a respective single core 102. Each of the ribbons 904 can include multiple individual cores 102. The ribbons 904 can be formed such that the ribbons 904 can be coupled with conventional and/or traditional ribbons. The ribbons 904 can be formed by coupling the cores 102 to one another and/or to a substrate. In various embodiments, the ribbons 904 can include twelve cores 102. In an illustrative embodiment, the ribbon 500 can include twelve multicore fibers 100 with each multicore fiber 100 having four cores 102 (e.g., the ribbon 500 includes forty-eight cores 102). The cores 102 from the multicore fibers 100 can be coupled and/or transitioned through the transition portion 903 to communicate with cores 102 grouped together to form four ribbons 904 with each ribbon having twelve cores 102, for example.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A process for coupling optic fibers, the process comprising:
   receiving three multicore fibers, each of the multicore fibers comprising four cores surrounded by a cladding, whereby twelve total cores of the multicore fibers are present;
   for each of the three multicore fibers, coupling the multicore fiber with a transition portion by coupling with an adaptor of the transition portion, whereby three adaptors are present;
   for each of the three adaptors, coupling the adaptor with four individual single core fibers, whereby twelve individual single core fibers are present;
   coupling the twelve individual single core fibers with a transition part of the transition portion; and coupling the transition part of the transition portion with an individual ribbon having twelve cores such that the twelve cores of the individual ribbon are coupled for respective transmission of signals through the twelve total cores of the multicore fibers.

2. The process of claim 1, wherein receiving the three multicore fibers comprises receiving a multicore fiber ribbon comprising the three multicore fibers.

3. The process of claim 1, wherein the transition portion comprises a housing configured to receive the three multicore fibers and the individual ribbon.

4. The process of claim 1, further comprising:
receiving a second set of three multicore fibers;
for each of the second set of three multicore fibers, coupling the multicore fiber with the transition portion; and
coupling the transition portion with a second ribbon for transmission of further signals through the second set of three multicore fibers and the second ribbon.

5. A system comprising:
a plurality of multicore fibers comprising at least three multicore fibers, each of the multicore fibers comprising a plurality of cores that comprises at least four cores, whereby at least twelve total cores of the multicore fibers are present;
a transition portion receiving the plurality of multicore fibers; and
an individual ribbon comprising a plurality of single core fibers each comprising a respective single core, the individual ribbon coupled with the transition portion to enable transmission of signals through paths formed through the plurality of multicore fibers, the transition portion, and the ribbon, wherein the transition portion is a predefined structure formed separately from the plurality of multicore fibers and the individual ribbon and connectable with the plurality of multicore fibers and the individual ribbon, wherein the transition portion comprises:
at least three adaptors each coupled with a different one of the at least three multicore fibers;
a plurality of individual single core fibers arranged so that each of the at least three adaptors is coupled with four individual single core fibers, whereby at least twelve individual single core fibers are present; and
a transition part receiving the plurality of individual single core fibers and receiving the individual ribbon.

6. The system of claim 5, wherein each of the multicore fibers further comprises a cladding surrounding the plurality of cores.

7. The system of claim 6, wherein each of the multicore fibers further comprises a first coating positioned around the cladding and a second coating positioned around the first coating, and wherein at least one of the first coating or the second coating is a UV coating.

8. The system of claim 6, wherein the plurality of cores of each of the multicore fibers are positioned within quadrants of the cladding, and wherein each of the multicore fibers further comprises an alignment marker surrounded by the cladding.

9. The system of claim 5, wherein the individual ribbon is a standardized ribbon included in a plurality of standardized ribbons coupled with the transition portion, and wherein the plurality of multicore fibers are disposed within a multicore fiber ribbon coupled with the transition portion.

10. A method comprising:
receiving a plurality of multicore fibers comprising at least three multicore fibers, each of the multicore fibers comprising a plurality of cores that comprises at least four cores, whereby at least twelve total cores of the multicore fibers are present;
accessing a transition portion independent and separate from the multicore fibers;
coupling the plurality of multicore fibers with the transition portion; and
coupling the transition portion with an individual ribbon of single core fibers each comprising a respective single core, wherein the cores of the individual ribbon are optically coupled with the cores of the plurality of multicore fibers for signal transmission as a result of the plurality of the multicore fibers and the individual ribbon each being coupled to the transition portion, wherein the transition portion comprises:
at least three adaptors each coupled with a different one of the at least three multicore fibers;
a plurality of individual single core fibers arranged so that each of the at least three adaptors is coupled with four individual single core fibers, whereby at least twelve individual single core fibers are present; and
a transition part receiving the plurality of individual single core fibers and receiving the individual ribbon.

11. The method of claim 10, wherein coupling the transition portion with the individual ribbon of single core fibers is included in coupling the transition portion with a plurality of ribbons of single core fibers for transmission of signals from the plurality of multicore fibers.

12. The method of claim 10, wherein receiving the plurality of multicore fibers comprises receiving a ribbon formed of multicore fibers.

13. The method of claim 12, wherein the coupling the plurality of multicore fibers with the transition portion comprises coupling the transition portion with the ribbon formed of multicore fibers.

14. The method of claim 13, wherein orientations of cores of the ribbon formed of multicore fibers are maintained during coupling the transition portion with the ribbon formed of multicore fibers.

* * * * *